US008165783B2

(12) United States Patent
Marzahn

(10) Patent No.: US 8,165,783 B2
(45) Date of Patent: Apr. 24, 2012

(54) METHOD OF CONTROLLING AN INJECTION QUANTITY OF AN INJECTOR OF AN INTERNAL COMBUSTION ENGINE

(75) Inventor: Gabriel Marzahn, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 346 days.

(21) Appl. No.: 12/526,998

(22) PCT Filed: Jan. 29, 2008

(86) PCT No.: PCT/EP2008/051056

§ 371 (c)(1),
(2), (4) Date: Aug. 13, 2009

(87) PCT Pub. No.: WO2008/101769

PCT Pub. Date: Aug. 28, 2008

(65) Prior Publication Data

US 2010/0036588 A1 Feb. 11, 2010

(30) Foreign Application Priority Data

Feb. 19, 2007 (DE) ......................... 10 2007 008 201

(51) Int. Cl.
*G06F 19/00* (2011.01)
*F02D 41/30* (2006.01)

(52) U.S. Cl. ......................... 701/104; 701/105; 123/478

(58) Field of Classification Search .......... 701/103–105, 701/107, 114, 115; 123/478, 480, 490; 361/154, 361/155

See application file for complete search history.

(56) References Cited

U.S. PATENT DOCUMENTS

| | | | | |
|---|---|---|---|---|
| 4,479,161 | A * | 10/1984 | Henrich et al. | 361/154 |
| 5,425,343 | A * | 6/1995 | Akaki et al. | 123/490 |
| 6,121,715 | A | 9/2000 | Hoffmann et al. | |
| 6,133,714 | A | 10/2000 | Hoffmann et al. | |
| 7,474,035 | B2 * | 1/2009 | Fukagawa et al. | 310/316.03 |
| 7,528,524 | B2 | 5/2009 | Rueger et al. | |
| 7,706,956 | B2 * | 4/2010 | Nagase et al. | 701/104 |
| 2005/0126534 | A1 * | 6/2005 | Kikutani | 123/299 |
| 2008/0184968 | A1 * | 8/2008 | Matsuura | 123/490 |

FOREIGN PATENT DOCUMENTS

| | | | |
|---|---|---|---|
| DE | 19652801 | C1 | 4/1998 |
| DE | 19723932 | C1 | 12/1998 |
| DE | 10025579 | A1 | 12/2001 |
| DE | 10303975 | A1 | 10/2003 |
| DE | 10336640 | A1 | 3/2005 |
| DE | 102004058971 | A1 | 6/2006 |
| WO | WO2004/036016 | A1 | 4/2004 |
| WO | WO2005/080776 | A1 | 9/2005 |

OTHER PUBLICATIONS

International Search Report, PCT/EP2008/051056, 12 pages, Jul. 3, 2008.

German Office Action, German application No. 10 2007 008 201.2-26, 3 pages, Aug. 8, 2007.

* cited by examiner

*Primary Examiner* — John T. Kwon
*Assistant Examiner* — Johnny Hoang
(74) *Attorney, Agent, or Firm* — King & Spalding L.L.P.

(57) ABSTRACT

In a method for controlling the injection amount for an injector on an internal combustion engine, dependent on a given time period and the duration of the hold phase, the energy stored in the injector is calculated either with a correction value or with the voltage and charge values at the end of the hold phase.

17 Claims, 2 Drawing Sheets

METHOD OF CONTROLLING AN INJECTION QUANTITY OF AN INJECTOR OF AN INTERNAL COMBUSTION ENGINE

CROSS-REFERENCE TO RELATED APPLICATIONS

This application is a U.S. National Stage Application of International Application No. PCT/EP2008/051056 filed Jan. 29, 2008, which designates the United States of America, and claims priority to German Application No. 10 2007 008 201.2 filed Feb. 19, 2007, the contents of which are hereby incorporated by reference in their entirety.

TECHNICAL FIELD

The invention relates to a method of controlling an injection quantity of an injector of an internal combustion engine according to the features of the preamble of claims 1 and 7.

BACKGROUND

Fuel injection devices for operating an i.c. engine have been generally known for many years. In a so-called common-rail injection system the feeding of fuel into the respective combustion chamber of the i.c. engine is effected by means of injectors. During this process a high injection pressure and precise control of the injection quantity is advantageous because this makes it possible to achieve, on the one hand, a high specific power of the i.c. engine and, on the other hand, a low emission of pollutants.

Control of the injection quantity is effected in this case by means of a closed control loop. The energy stored in the injector is used as a controlled variable as this energy correlates with the injection quantity. By means of a supply unit the individual injectors are then charged and discharged. Under certain conditions, as will be explained in more detail in the description of the figures, it may happen that the calculated energy stored in the injector does not correlate with the injection quantity and so the closed control loop no longer operates in an optimum manner.

SUMMARY

According to various embodiments, a method can be provided that enables more precise control of the injection quantity by way of a more precise calculation of the energy quantity stored in the injector.

According to an embodiment, in a method of controlling the injection quantity of a chargeable and dischargeable injector, in particular a piezoelectric injector, of an internal combustion engine, an injector voltage and an injector charge are determined, by means of which an energy, which is stored in the injector and correlates with the injection quantity, as well as an injector capacity are calculated. According to this method,—the charge value and the voltage value are determined after a definable time after the end of the charging phase of the injector, and from the values a first energy value is calculated,—given a period of time that is longer than a definable period of time for a retaining phase arising between the charging phase and the discharge phase, the voltage value and the charge value of the injector are determined anew and from the values a second energy value and a correction value are calculated, the correction value being stored in a first characteristics map, and if a period of time that is shorter than a definable time period for a retaining phase arising between the charging phase and the discharge phase, the first calculated energy value is multiplied by the correction value stored in the first characteristics map.

According to a further embodiment, the instant of the second voltage measurement and of the second charge measurement may be at the end of the retaining phase. According to a further embodiment, for determining the second energy value the charge determined at the end of the charging phase may be squared and divided by the calculated capacity at the end of the retaining phase and multiplied by the factor 0.5. According to a further embodiment, the correction value can be stored in a first characteristics map, in dependence upon an actuator temperature of the injector and a rail pressure. According to a further embodiment, the actuator temperature can be determined by determining a mean capacity value of all actuators over a definable number of injections, and by means of a stored second characteristics map the actuator temperature for the mean capacity value determined in each case is identified. According to a further embodiment, when the correction values are stored in the first characteristics map, the values present in the characteristics map prior to storing can be overwritten.

According to another embodiment, in a method of controlling the injection quantity of a chargeable and dischargeable injector, in particular a piezoelectric injector, of an internal combustion engine, an injector voltage and an injector charge are determined, by means of which an energy stored at the injector is calculated, which correlates with the injection quantity, and an injector capacity. According to this embodiment,—a mean charge value and a mean voltage value are determined after a definable time after the end of the charging phase of all injectors, and from the values a first energy value is calculated,—if the period of time of a retaining phase between the charging phase and the discharge phase is longer than a definable time period, the mean voltage and the mean charge of all injectors are determined at a definable instant, and a second energy value and a correction value are calculated, the correction value being stored in a first characteristics map, and if the period of time of a retaining phase between the charging phase and the discharge phase is shorter than a definable time period, the first calculated energy value is multiplied by the correction value stored in the first characteristics map.

According to a further embodiment, the instant of the second voltage measurement and charge measurement may be at the end of the retaining phase.

BRIEF DESCRIPTION OF THE DRAWINGS

Particulars of the invention are described in detail with reference to the drawings. These show.

DETAILED DESCRIPTION

According to the various embodiments, by means of a second measurement of the voltage value and the charge value, the energy amount stored in the injector may be calculated more precisely. This prevents injectors with a large return stroke being charged to a lesser extent and hence injecting a lesser amount. In this way return stroke influences, which with only a single measurement lead to defective control of the injection quantity, may be prevented. In particular it is thereby possible to avoid a complex burst measurement with sensor detection analysis.

According to a further embodiment, it is provided that a calculated correction value is stored in a characteristics map. The correction value in this case describes the extent of the return stroke change and/or the influence of the filling state in the actuator antechamber upon the energy stored in the injector. As the return stroke of the injector may vary during operation and this has an effect upon the capacity of the injector, the calculation of the stored energy is therefore distorted if the return stroke is not taken into account. A correction value that is re-calculated at regular intervals may therefore ensure that the influence of the return stroke variation on the energy calculation is taken into account.

According to a further embodiment, it is provided that for the energy calculation, in the situation where the length of time of the retaining phase is longer than a definable period, only the capacity at the end of the retaining phase is used. As a result, neither a possible feed of the charge because of piezoelectric capacity variations and because of a possibly provided output filter during the retaining phase nor the discharge of the injector because of a possible parallel shunt in long retaining phases has an adverse effect upon the accuracy of the calculated energy value.

According to a further embodiment, by way of a calculated mean capacity of all injectors over a plurality of working cycles an actuator temperature of an injector may be determined. This makes it possible to dispense with an additional temperature sensor for measuring the actuator temperature.

Figure 1:
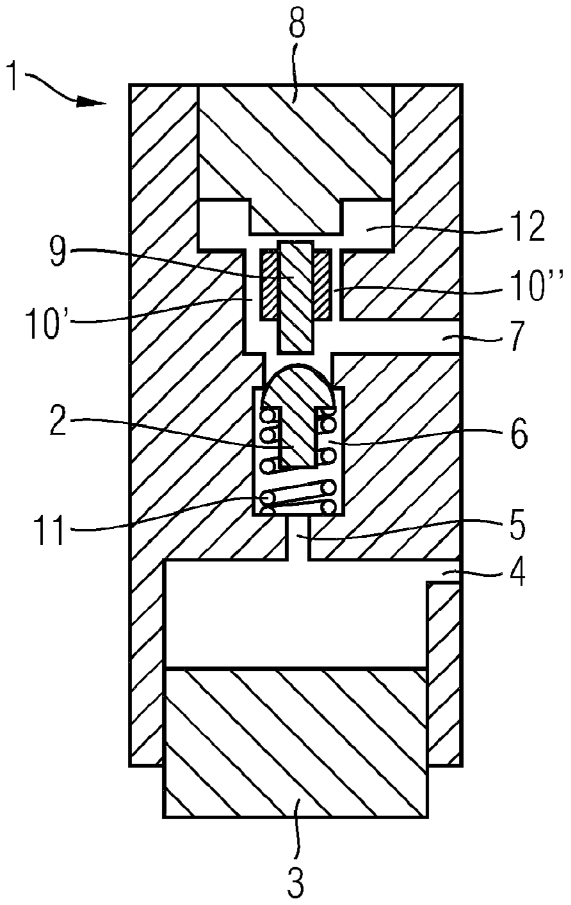
FIG. 1: a diagrammatic representation of a piezoelectric injector.

FIG. 1 shows a diagrammatic representation of a piezoelectric injector 1, which is composed of an actuator 8, an injector needle 3, a control piston 9 and a control valve 2. The control valve 2 in this case separates an intermediate control chamber 6 from a return channel 7, the control valve 2 being held in this position by means of a preloaded spring 11.

Highly pressurized fuel passes via an input throttle 4 into the injector 1 and via an output throttle 5 into the intermediate chamber 6. Two lines 10' and 10" moreover separate an actuator antechamber 12 from the return channel 7. In this case, the actuator antechamber 12 and the return channel 7 are filled with fuel at all times.

When the control valve 2 opens, the highly pressurized fuel of the intermediate control chamber 6 expands and flows into the low-pressure region of the return channel 7. This leads to a momentary pressure increase within the return channel 7 and so for a short time fuel flows out of the return channel 7 through the two lines 10' and 10" into the actuator antechamber 12 and hence exerts a counterforce on the movement of the actuator 8. At the same time the injector needle 3 starts to move in the direction of the actuator 8 and therefore carries on feeding fuel through the output throttle 5 into the intermediate chamber 6 and hence also into the return channel 7. In this case, the counterforce upon the actuator 8 is maintained until the low pressure has spread from the return channel 7 to the output throttle 5.

The filling state of the actuator antechamber 12 moreover has an influence on the injector operation. In the initial state, the actuator antechamber 12 is full of fuel. In this case, however, it may happen that an air bubble has formed in the actuator antechamber 12. Because of this air bubble the counterforce opposing the actuator movement is lower than in the case of an exclusive filling of the actuator antechamber 12 with fuel. Upon a collapse of the air bubble the counterforce increases, with the result that a greater charge has to be fed in the direction of the actuator 8.

Figure 2:
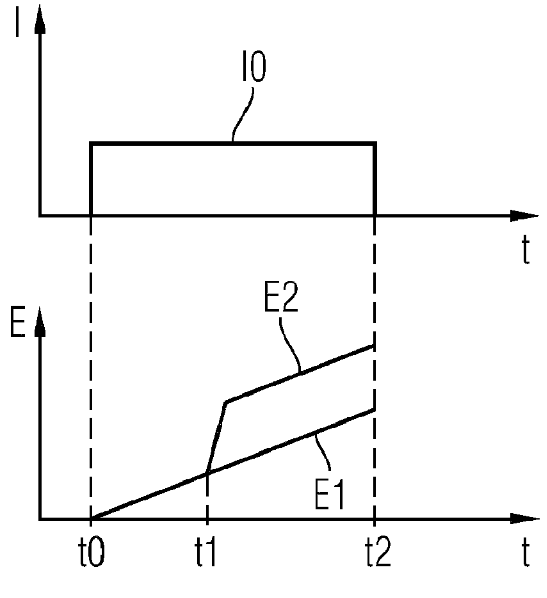
FIG. 2: the time characteristic of the stored energy of an injector during a charging phase of the injector.

FIG. 2 shows the time characteristic of the stored energy of an injector during a charging phase of the injector. The top diagram here shows the charging pulse I fed to the injector as a function of time. The bottom diagram shows the development of the energy E stored in the injector as a function of time. Here, in the case of the energy characteristic a distinction is made between whether or not an action of force upon the movement of the actuator, as described in FIG. 1, occurs. The calculation of the energy stored in the injector is effected by multiplying a determined voltage value by a determined charge value and a factor 0.5.

A charging pulse I0 is fed to the injector. The charging pulse I0 in this case starts at the time t0 and ends at the time t2. The calculated characteristic E1 of the energy stored in the injector in this case rises from the start of the charging pulse I0 at the time t0 and runs for example linearly. With this characteristic it is ensured that the fuel from the return channel does not flow into the actuator antechamber and exert a counterforce on the movement of the actuator there.

The situation, where the counterforce because of an air bubble in the actuator antechamber is lower than the counterforce in the case of exclusive filling of the actuator antechamber with fuel, is not represented. The calculated energy characteristic for this situation would then, from the time t1 onwards, fall and subsequently run linearly.

The energy characteristic E2, on the other hand, represents the characteristic from when a counterforce is exerted on the movement of the actuator. The energy characteristic E2 in this case starts, just like the energy characteristic E1 at the time t0, to rise linearly. From the time t1 the fuel flowing into the actuator antechamber presses against the movement of the actuator. Consequently, the actuator is unable to expand as much as an unloaded actuator, and the voltage across the actuator rises. Because of the voltage rise, the value of the energy stored in the injector likewise rises steeply and then runs on linearly up to the time t2. In this case, for the energy calculation it is immaterial whether the determined charge has risen or fallen because the raised voltage value of the actuator dominates the value of the charge.

For a control operation by means of the energy E2 stored in the injector, the closed control loop from the time t1 determines too high an energy value. It will therefore reduce the charge supplied to the injector in order to lower the energy stored in the injector. The lower energy stored in the injector will however subsequently lead to the injection of too low a quantity of fuel. Under these conditions, therefore, the energy quantity stored in the injector no longer correlates with the injection quantity.

Figure 3:
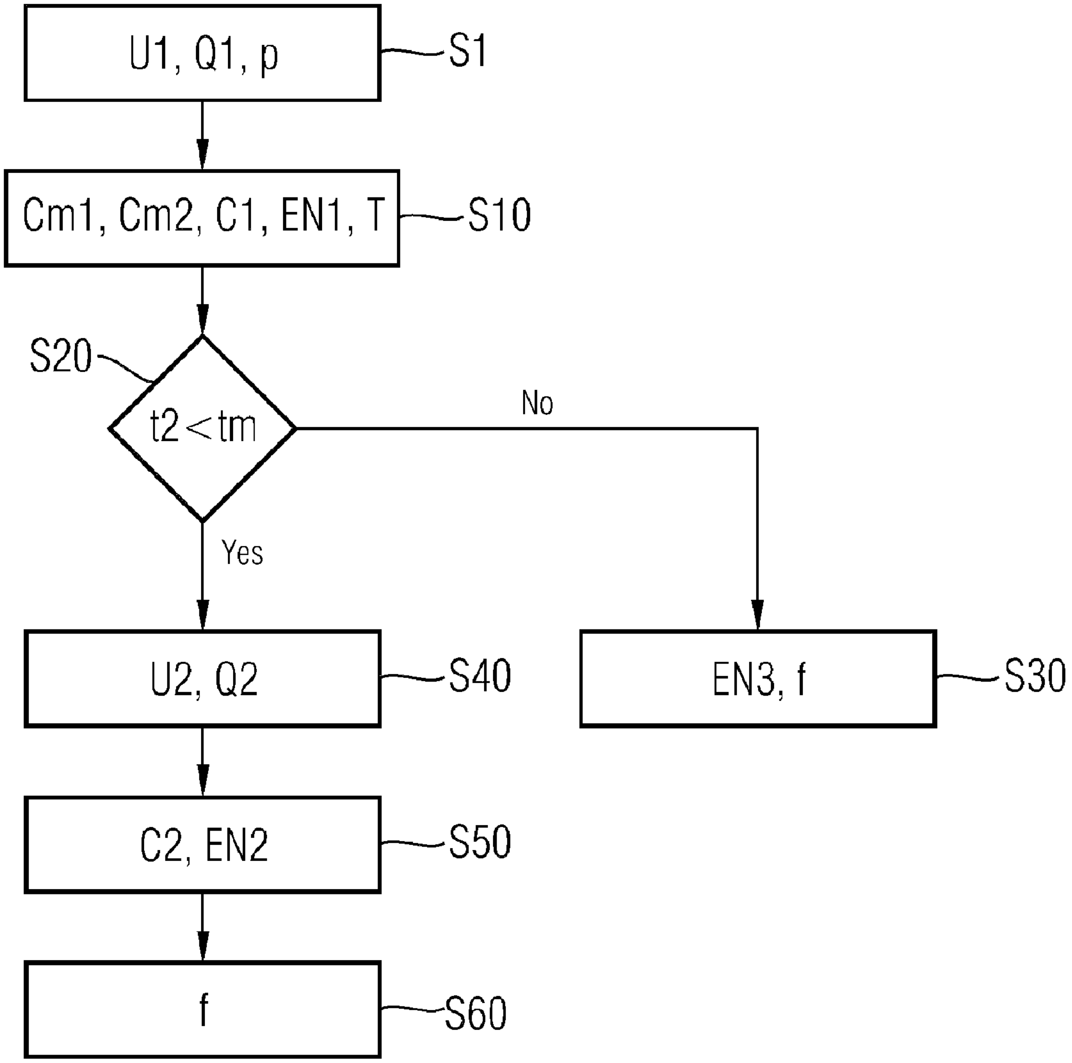
FIG. 3: a flowchart for calculating the energy stored in the injector.

FIG. 3 shows a flowchart for calculating the energy stored in the injector. Here, in step S1 there is determined in each case for each injector a first voltage value U1, a first charge value Q1 and a rail pressure p after a definable period after the end of the charging phase of the injector. In step S10 by means of the voltage—and charge values determined in step S1 a first energy value EN1 stored in the injector and a first capacity value C1 are determined. The energy amount EN1 stored in the injector is determined by multiplying the voltage value U1 determined in step S1 by the determined charge value Q1 and the factor 0.5. The energy calculation in this case is not restricted to this example, rather other types of energy calculation are also conceivable.

Furthermore, for each injection a first mean capacity value Cm1 of all capacities of the respective injectors is generated and stored. As soon as a specific number of injections has been completed by the injectors, a second mean capacity value Cm2 of all injectors may be calculated by means of the first mean capacity value Cm1 stored in each case for each injection. Here, it has proved advantageous to calculate the mean capacity value Cm2 after 100 injections. By means of the calculated second mean capacity value Cm2 an actuator temperature T may be determined by way of a stored characteristics map.

In step S20 it is checked whether a retaining phase time length tm is longer than a definable period t2. Should this be the case, then in step S40 at the definable time t2 a second voltage value U2 and a second charge value Q2 are determined. The time t2 is however selected in such a way that the distortions of the energy calculations because of an exertion of force by the fuel on the movement of the actuator as a result of the flow of the fuel from the return channel into the actuator antechamber no longer occur. In this respect it has proved advantageous if the time tm is selected as close as possible to the end of the retaining phase.

Then, in step S50, by means of the voltage value U2 and charge value Q2 determined in each case in step S40 a second capacity value C2 and a second energy value EN2 stored in the injector are calculated. In this case, for calculation of the second energy value EN2 the charge value Q1 determined in step S1 is squared and multiplied by a factor 0.5 and divided by the second capacity value C2 determined in step S50. Based on the first energy value EN1 determined in step S10 and the second energy value EN2 determined in step S50, in step S60 a correction value f is determined by dividing the first energy value EN1 determined in step S10 by the second energy value EN2 determined in step S50.

Furthermore, in step S60 the correction value f is stored in a characteristics map, in dependence upon the rail pressure determined in step S1 and upon the actuator temperature T determined in step S10. When these correction values are stored, the values already in the characteristics map are overwritten. By updating the correction value f it is therefore possible to ensure that an adaptation of the calculation of the energy values stored in the injector that is necessary because of a return stroke variation arising during operation is effected. A capacity variation occasioned by a return stroke variation has an effect upon the voltage determined in step S40 and hence upon the stored energy calculated in step S50 and hence also upon the correction value f calculated in step S60.

Should the result of the interrogation in step S20 be that the retaining phase time length tm is shorter than a definable period t2, then in step S30 a third energy value EN3 is calculated by means of the first energy value EN1 calculated in step S10 and by means of a correction value f that is valid for this actuator temperature T and this rail pressure p. In this case, the energy value EN1 is multiplied by the correction value f.

As an alternative to the method presented in FIG. 3, a mean voltage value, charge value and capacity value of all injectors may be used for the energy value calculation in the steps S10 and S50.

What is claimed is:

1. A method of controlling the injection quantity of a chargeable and dischargeable injector of an internal combustion engine, in which an injector voltage and an injector charge are determined, by means of which an energy, which is stored in the injector and correlates with the injection quantity, as well as an injector capacity are calculated, the method comprising the steps of:

- determining a charge value and a voltage value after the end of a charging phase of the injector, and calculating a first energy value and a first capacity value from said charge value and said voltage value,
- if a time length of a retaining phase between the charging phase and the discharge phase is longer than a definable period of time:
  - determining a new voltage value and a new charge value of the injector,
  - calculating a second capacity value from said new charge value and said new voltage value,
  - calculating a second energy value based on a square of the charge value and the second calculated capacity value,
  - determining a correction value based on the first calculated energy value and the second calculated energy value, and
  - storing the correction value in a first characteristics map, and
- controlling said injector based on the calculated second energy value.

2. The method according to claim 1, wherein the instant of the second voltage measurement and of the second charge measurement is at the end of the retaining phase.

3. The method according to claim 1, wherein for determining the second energy value the charge determined at the end of the charging phase is squared and divided by the calculated capacity at the end of the retaining phase and multiplied by the factor 0.5.

4. The method according to claim 1, wherein the correction value is stored in a first characteristics map, in dependence upon an actuator temperature of the injector and a rail pressure.

5. The method according to claim 1, wherein the actuator temperature is determined by determining a mean capacity value of all actuators over a definable number of injections, and by means of a stored second characteristics map the actuator temperature for the mean capacity value determined in each case is identified.

6. The method according to claim 1, wherein when the correction values are stored in the first characteristics map, the values present in the characteristics map prior to storing are overwritten.

7. A method of controlling the injection quantity of a chargeable and dischargeable injector of an internal combustion engine, in which an injector voltage and an injector charge are determined, by means of which an energy stored at the injector is calculated, which correlates with the injection quantity, and an injector capacity, that the method comprising the steps of:

- determining a mean charge value and a mean voltage value after the end of the charging phase of all injectors, and calculating a first energy value and a first capacity value from said mean charge value and said mean voltage value,
- if the period of time of a retaining phase between the charging phase and the discharge phase is longer than a definable time period,
  - determining an instantaneous mean voltage and an instantaneous mean charge of all injectors at a definable instant,
  - calculating a second capacity value from said instantaneous mean charge and said instantaneous mean voltage,
  - calculating a second energy value based on a square of the mean charge value and the second calculated capacity value,
  - determining a correction value based on the first calculated energy value and the second calculated energy value, and
  - storing the correction value in a first characteristics map, and
- controlling said injector based on the calculated second energy value.

8. The method according to claim 7, wherein the instant of the second voltage measurement and charge measurement is at the end of the retaining phase.

9. The method according to claim 1, wherein the chargeable and dischargeable injector, is a piezoelectric injector.

10. The method according to claim 7, wherein the chargeable and dischargeable injector, is a piezoelectric injector.

11. A method for controlling the injection quantity of a chargeable and dischargeable injector of an internal combustion engine, comprising the steps of:

determining a charge value and a voltage value after the end of a charging phase of the injector, and calculating a first energy value and a first capacity value from said charge value and said voltage value, if a time length of a retaining phase between the charging phase and the discharge phase is longer than a definable period of time:

determining a new voltage value and a new charge value of the injector calculating a second capacity value from said new voltage value and said new charge value, calculating a second energy value based on a square of the charge value and the second calculated capacity value, determining a correction value based on the first calculated energy value and the second calculated energy value, and storing the correction value in a first characteristics map, and controlling said injector according to the determined second energy value.

12. The method according to claim 11, wherein the instant of the second voltage measurement and of the second charge measurement is at the end of the retaining phase.

13. The method according to claim 11, wherein for determining the second energy value the charge determined at the end of the charging phase is squared and divided by the calculated capacity at the end of the retaining phase and multiplied by the factor 0.5.

14. The method according to claim 11, wherein the correction value is stored in a first characteristics map, in dependence upon an actuator temperature of the injector and a rail pressure.

15. The method according to claim 11, wherein the actuator temperature is determined by determining a mean capacity value of all actuators over a definable number of injections, and by means of a stored second characteristics map the actuator temperature for the mean capacity value determined in each case is identified.

16. The method according to claim 11, wherein when the correction values are stored in the first characteristics map, the values present in the characteristics map prior to storing are overwritten.

17. The method according to claim 11, wherein the chargeable and dischargeable injector, is a piezoelectric injector.

* * * * *